May 14, 1957 J. A. DONATO 2,792,123
REPACKABLE FILTER CARTRIDGE
Filed May 5, 1953
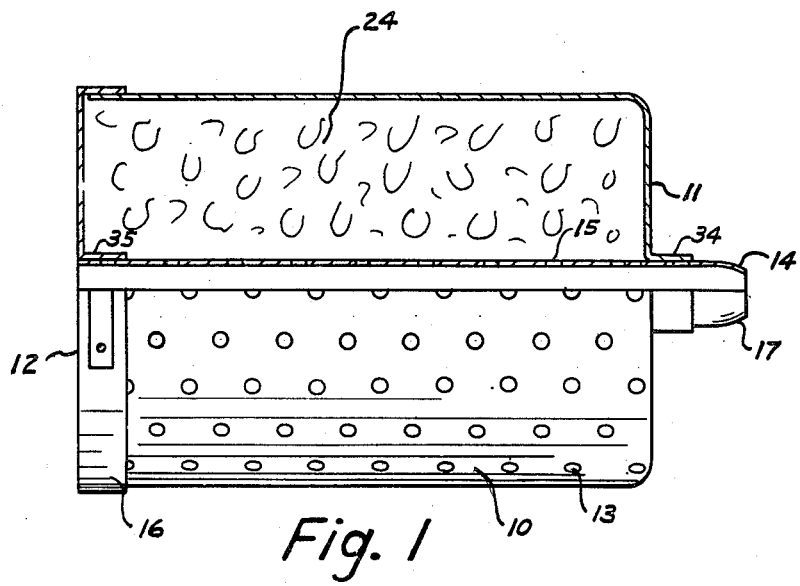
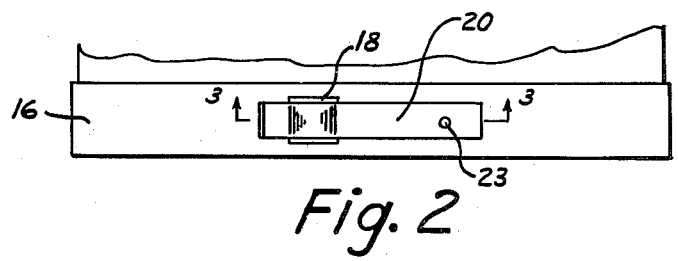
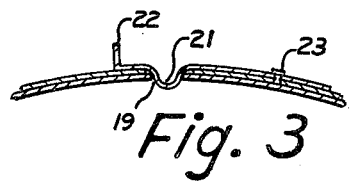
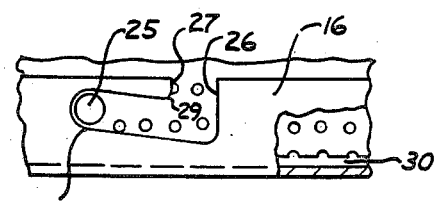
INVENTOR.
John A. Donato
BY Woodling and Krost
attys United States Patent Office 2,792,123
Patented May 14, 1957

2,792,123

REPACKABLE FILTER CARTRIDGE

John A. Donato, Brecksville, Ohio, assignor, by mesne assignments, to Erie Meter Systems, Inc., a corporation of Pennsylvania Application May 5, 1953, Serial No. 353,151

3 Claims. (Cl. 210—457)

My invention relates to a repackable filter cartridge for use within a case in the process of elimination of sludge and such foreign matter from the oil used in lubrication of engines, with particular reference to internal combustion engines, and comprises such parts as will allow the filtering material contained therein to be ejected by hand for replacement with a fresh supply.

An object of my invention is that the filtering media may be removed along with one end wall plate, usually with one hand, and the dirty filtering media cast into a refuse container without the necessity of touching by hand.

Another object of my invention is to relieve interior supporting pressure upon a compressible filtering media unit, whereby the compressible filtering media unit may be readily removed.

Still another object of my invention is to provide a container cartridge with longitudinally expandable end wall means to permit a constant sludge breaking action.

Other objects and a fuller understanding of the invention may be had by referring to the following description and claims, taken in conjunction with the accompanying drawings, in which:

Figure 1 is an elevational view, partially in section, of a cartridge with removable and replaceable filtering media therein, and setting forth the principles of this invention;

Figure 2 is an enlarged detail of the telescoping overlap between one end wall and the cartridge side wall, and showing an interlocking engagement means in full front view;

Figure 3 is a sectional view of the interlocking engagement means as taken along line 3—3 of Figure 2; and Figure 4 is a fragmentary view of the telescoping overlap and an alternate type of interlocking engagement means.

In the drawing, the reference character 10 indicates a cartridge shell of a filtering construction embodying the principles of this invention. The filter is illustrated in a horizontal position, although generally it will be used in a vertical position. The illustrated embodiment of the invention is equipped with end walls 11 and 12. End wall 11 is integrally formed with the cartridge shell 10. Many such filtering devices have a removable end wall in place of wall 11.

End walls 11 and 12 are both provided with center openings outlined by annular walls 34 and 35. A tube 14 forms a central axis within the cartridge shell 10. The tube is preferably carried by the end wall 12 by joining the tube 14 an dthe annular wall 35, such as by means of spot-welding. In the illustrated construction, the tube 14 is allowed to remain as a sliding fit with the annular wall 34. The end of the tube 14 is tapered to provide a round nose end 17.

Circulation of oil or other fluids to be filtered must be moved laterally through the filter either from the tube 14 and out through the cartridge shell 10, or in through the cartridge shell 10 and out through tube 14. Therefore, both the cartridge shell and the tube are perforated as indicated by reference characters 13 and 15 respectively. The operation of filtering devices of this nature is generally well understood and, accordingly, the cooperating structure of the permanent filter housing is not illustrated.

There is a central bolt within a housing. The tube 14 has a sufficiently large diameter to fit over that bolt and the cartridge shell 10 is small enough to fit within the housing. Regardless of whether the flow of oil is to the outside-in, or to the inside-out, the bolt is provided with an aperture somewhere intermediate the ends thereof. Accordingly, suitable sealing members are provided within the tube 14 as set forth in a co-pending application, Serial No. 353,152, entitled "Oil Filter Seal Construction" filed concurrently herewith.

The end wall 12 has a side wall 16 to fit over the cartridge shell 10 with a sliding fit. Consequently, it may be said that the wall 12 has a telescoping fit with respect to the cartridge shell.

The side wall 16 is provided with a rectangular opening 18 and the cartridge shell 10 is provided with a similar opening 19. Openings 18 and 19 may be registered to provide an entrance opening through to the interior of the cartridge shell 10. A spring lock 20, as best illustrated in Figure 2 of the drawing is provided with a detent portion 21 and a thumb tab portion 22. This spring lock 20 is mounted on the outside of the side wall 16, such as by the rivet 23 shown in the drawing. The detent, by extending through the registered openings 18 and 19, provides a convenient manner in which to lock the end wall 12 in engagement with the cartridge shell 10. However, the width of the openings 18 and 19 as compared with the width of the detent portion 21 is such that the end wall 12 can move a slight amount longitudinally with respect to the longitudinal axis of the cartridge shell 10. Preferably, there are two such spring lock devices, one on opposite sides of the side wall 16.

In Figure 4 of the drawing there is illustrated an alternate type of interlocking mechanism to hold the end wall 12 engaged with the cartridge shell 10. The construction shown in Figure 4 is in many respects superior to that shown in Figures 2 and 3. The construction as illustrated in Figure 4 embodies a stud 25, which is carried by the cartridge shell 10 in the illustrated embodiment, and a bayonet slot 26 which is cut into the side wall 16 in the illustrated embodiment of the invention. The bayonet slot 26 has an entrance end portion 27 and a dead end portion 28. The bayonet slot is cut in such a manner that a "high point" 29 is produced. Thus, the end wall 12 must be compressed towards the shell 10 a distance greater than the position in which it will normally rest in order to pass over the high point 29. A space, or clearance, 30 is provided in order to allow a small amount of endwise movement of the end wall 12 with respect to the shell 10.

The provision for a slight amount of endwise movement of the end wall 12 with respect to the shell 10 has been found to be very important. Both modifications illustrated will produce that endwise movement.

In the drawing there is illustrated a quantity of filtering material 24. The invention will operate successfully with material packed in the cartridge shell as illustrated.

The advantages found to exist in the illustrated embodiment of the invention are greater than one would be led to believe by a cursory examination. The filtering material 24 will tend to expand under the high pressure of the oil passing through the filter. By allowing a small amount of end play in the end wall 12, the end wall moves out a maximum amount while the engine is running. As soon as the pressure is released, however, the weight of the cartridge shell when in a vertical position will settle downwardly and tend to compress the filter material. The amount of expansion and compression between pressure cycles is exceedingly slight, but the small amount that does exist has been found to cause a breaking of the sludge film which tends to settle along the contact surfaces between the filtering material and the metal walls. This is true along the walls of the tube 14. The slight amount of movement keeps the sludge film broken between the wall of tube 14 and the filtering material 24.

The advantage which is gained by using a casing type of pre-formed replaceable filtering packet is most apparent when the direction of oil flow is from the inside outwardly from the tube towards the cartridge shell. Such use tends to pack the filter material tightly against the inside wall of the cartridge shell and will have a very loose fit between the filter material and the tube 14. Under the opposite circumstances of an out-side-in flow, the packing material is tight upon the tube 14 and then when the end wall 12 and the tube 14 are removed as a unit, the packing media will come along and can be shaken off into a refuse container. When the condition of flow is from inside-out and the filtering material is tightly engaged with the side walls of cartridge shell, then removal of end wall 12 and the tube 14 will leave the filter material within the housing. By removing the end wall and the tube the draw-string area of the filtering media unit can be engaged with a hook or the finger and the filtering material can then be readily removed.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A perforated oil filtering cartridge for holding replaceable filtering material, said cartridge comprising, a perforated outer cartridge filter wall, a first end wall having a central opening, a second end wall having a central opening, a central perforated tube disposed within the outer cartridge filter wall and defining therewith a space for said filtering material, said tube carried by said first end wall in registration with the central opening thereof, said tube having a rounded nose end for location of the tube with respect to the central opening of the second end wall, said first end wall having a side wall to telescope with respect to said outer cartridge filter wall, a first opening through said side wall, a second opening through the cartridge filter wall in position to register with the first opening, an interlocking surface member adapted to extend through said first and second openings when registered and thereby lock the members together, said registered openings and interlocking surface member having a degree of looseness for slight axial movement between the first end wall and the cartridge wall.

2. A perforated oil filtering cartridge for holding replaceable filtering material, said cartridge comprising, a perforated outer cartridge filter wall, a first end wall having a central opening, a second end wall having a central opening, a central perforated tube disposed within the outer cartridge filter wall and defining therewith a space for said filtering material, said tube carried in registration with the central opening of said end walls, said first end wall having a side wall to telescope with respect to said outer cartridge filter wall, a first opening through said side wall, a second opening through the cartridge filter wall in position to register with the first opening, an interlocking surface member adapted to extend through said first and second openings when registered and thereby lock the members together, said registered openings and interlocking surface member having a degree of looseness for slight axial movement between the first end wall and the cartridge wall.

3. A perforated oil filtering cartridge for holding replaceable filtering material, comprising a perforated outer cartridge filter wall, a first end wall having a central opening therein, a second end wall integrally connected to said outer cartridge filter wall and having a central opening therein, a central perforated tube having first and second end portions and disposed within said outer cartridge filter wall and defining therewith a space for said filtering material, said first end portion of said perforated tube residing within said opening in said first end wall and being fixedly connected thereto, said second end portion of said perforated tube slidably residing within said opening in said second end wall, said first end wall having a side wall to telescope with respect to said outer cartridge filter wall, said side wall of said first end wall having a first opening therethrough, said cartridge filter wall having a second opening extending therethrough in position to register with said first opening in said side wall, an interlocking surface member fixedly secured at one end portion thereof to said side wall and having another portion thereof adapted to extend through said first and second openings when registered and thereby lock said second end wall and said outer cartridge filter wall together, said registered openings being larger than said portion of said interlocking surface member which extends therethrough thereby providing a degree of looseness for axial movement between said first end wall and said outer cartridge filter wall.

References Cited in the file of this patent
UNITED STATES PATENTS

| | | |
|---|---|---|
| 1,830,742 | McKinley | Nov. 3, 1931 |
| 2,031,935 | Cuno | Feb. 25, 1936 |
| 2,203,668 | Burchalter | June 11, 1940 |
| 2,218,339 | Manning | Oct. 15, 1940 |
| 2,381,141 | Russell | Aug. 7, 1945 |
| 2,550,853 | Nugent | May 1, 1951 |
| 2,559,133 | Schultz | July 3, 1951 |
| 2,601,404 | Lasky | June 24, 1952 |
| 2,614,694 | Sather | Oct. 21, 1952 |
| 2,689,048 | Powers | Sept. 14, 1954 |
| 2,707,611 | Fricke | May 3, 1955 |